Nov. 7, 1933. E. C. BOOTH 1,934,223
MOUNTING FOR REAR-VISION MIRRORS
Filed Nov. 16, 1931
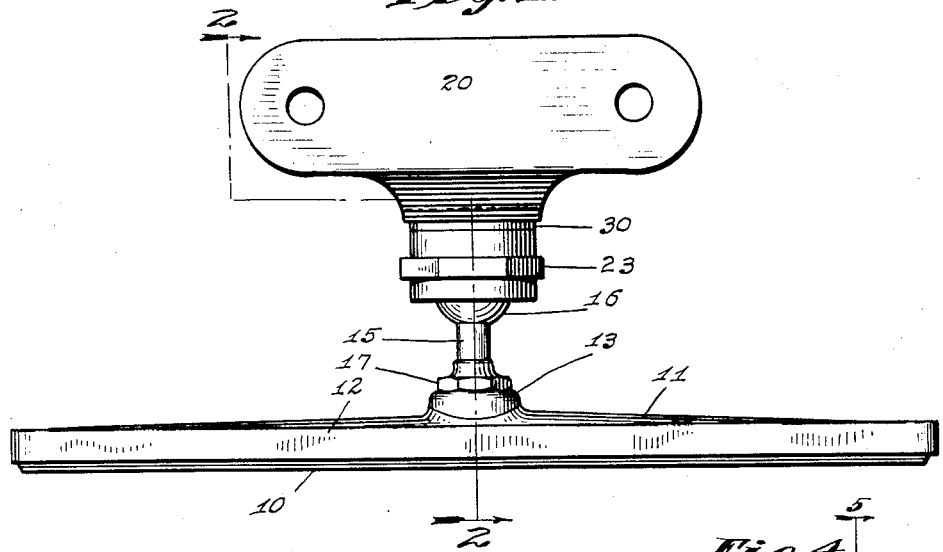
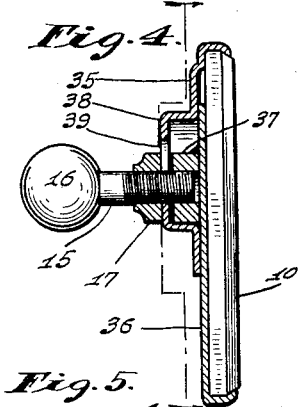
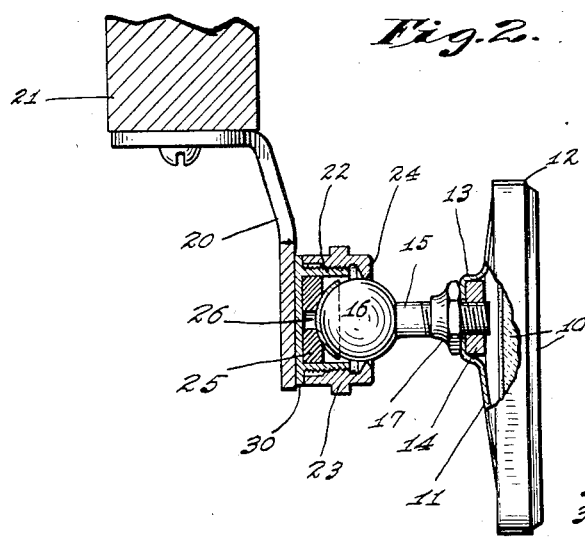
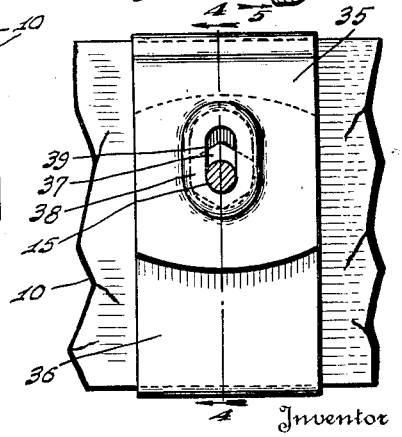
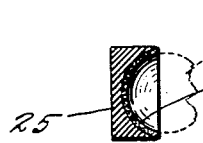
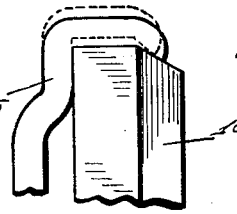
Inventor
EARL C. BOOTH
By
Attorneys Patented Nov. 7, 1933

1,934,223

UNITED STATES PATENT OFFICE 1,934,223

MOUNTING FOR REAR-VISION MIRRORS

Earl C. Booth, Indianapolis, Ind., assignor to Noblitt-Sparks Industries, Inc., Indianapolis, Ind., a corporation of Indiana Application November 16, 1931
Serial No. 575,197

5 Claims. (Cl. 45—97)

It is the object of my invention to provide for a rear-vision mirror of the type used in automobiles, a mounting which will permit easy and rapid adjustment of the mirror and which at the same time will hold the mirror against accidental displacement from its adjusted position. A further object of my invention is to provide a mirror mounting which may be economically manufactured and which will have a pleasing appearance.

In carrying out my invention I mount the mirror through a ball-and-socket joint, the ball-member of the joint being carried by the mirror and the socket-portion of the joint being supported from some convenient point on the automobile. The socket portion of the joint comprises two members which exert a yielding clamping effect on the ball, the parts being so arranged that the clamping pressure is fixed in the manufacture of the mounting.

The accompanying drawing illustrates my invention: Fig. 1 is a plan view of the rear-vision mirror and its mounting; Fig. 2 is a vertical section on the line 2—2 of Fig. 1; Fig. 3 is a detailed view illustrating in section a modified form of the member which is employed to secure the yielding clamping pressure on the ball of the mirror-mounting; Fig. 4 is a vertical section similar to Fig. 2 and taken on the line 4—4 of Fig. 5, but showing a different form of means for holding the mirror; Fig. 5 is a section on the line 5—5 of Fig. 4; and Fig. 6 is a fragmental end elevation of the mirror shown in Fig. 5 and is on an enlarged scale.

In the construction illustrated in Figs. 1 and 2 the mirror 10 is mounted in a frame having a back 11 and a flange 12 which overlies the edges of the mirror and retains it in place. The back 11 of the frame is formed with an outwardly extending projection 13 which provides within the frame a pocket for the reception of a nut 14. The nut 14 receives the screw-threaded shank 15 of a ball-member 16, the parts being secured together by a check-nut 17 between which and the nut 14 the material of the back 11 is clamped.

The mirror is mounted in the automobile through the medium of a bracket 20 which is adapted to be secured to some point on the automobile body such as the cross-member 21 which extends transversely of the automobile at the top of the windshield. On this bracket 20, I secure a sleeve 22 provided exteriorly with screw-threads which co-operate with threads in a nut 23. Near the outer end, the nut 23 has an inwardly directed annular flange 24 the opening through which is of somewhat smaller diameter than the ball 16 in order to retain the ball in place.

For the purpose of exerting a yielding clamping pressure on the ball 16, I provide within the sleeve 22 a block 25 of yielding material, such as soft rubber. Between the ball 16 and the block 25 there is inserted a cupped or dished piece 26 of material which prevents direct contact between the ball 16 and the block 25. The cup 26 may conveniently be made of brass or some other metal having satisfactory bearing properties. Without some such provision, the block 25 of soft rubber might stick to the ball 16 and prevent that relative movement of the ball and block which is necessary in securing the adjustment of the mirror.

I have found that with a block 25 of yieldable material, acting to exert a clamping pressure on the ball 16 it is unnecessary to loosen the nut 23 in changing the position of the mirror. That is, the pressure which the block 25 of yielding material exerts on the ball may be so regulated in the manufacture of the mounting that it is sufficient to hold the mirror in any desired position of adjustment while still being insufficient to prevent manual adjustment of the mirror when it is desired to change its position. In order to secure and maintain this desired degree of clamping pressure, I provide between the nut 23 and the sleeve 22 or bracket 20 co-operating abutments which limit the extent to which the nut 23 can be tightened. In the construction illustrated in the drawing, the desired result is accomplished by forming the nut 23 of such a length that its inner end abuts against a flange 30 on the sleeve 22. By properly co-ordinating the length of the nut 23 and the thickness of the block 25 of resilient material, it is possible to clamp the ball 16 with sufficient force to prevent accidental displacement of the mirror while still permitting it to be manually adjusted when desired. It will be evident that the exact thickness of the block 25 will depend upon the nature of the material of which it is formed, as well as upon the length of the nut and the position of the flange 24.

In Fig. 3, the block 25 is illustrated as formed with a hemispherical depression in its front face, the surface of this depression being covered with a layer of fabric 32 which may be vulcanized in place. This fabric prevents direct contact between the soft rubber of the block 25 and the metal of the ball 16, and thus prevents any tendency of the rubber to adhere to the ball.

In Figs. 4, 5, and 6, I have illustrated a modification of my invention in which a different means for securing the mirror to its mounting is employed. In this arrangement, the mirror is clamped between two clamping members comprising metal strips 35 and 36 which overlap on the back face of the mirror and the ends of which are bent forwardly to embrace the edges of the mirror. On the back face of one of these strips, here shown as the strip 36, I secure, as by welding or brazing, a nut 37. The other strip, here shown as the strip 35, is embossed outwardly to provide a cup 38 which receives the nut 37. The cup 38 is provided with a slot 39 extending transversely of the mirror and adapted to receive the shank of the ball member 15 which passes through the slot and into the nut 37. The check nut 17 serves to clamp the two strips 35 and 36 together.

In assembling the device just described, the two strips 35 and 36 are put in place on the mirror, and the shank of the ball member 15 is screwed into the nut 37. Pressure is then applied to the bent-over ends of the strips 35 and 36 to force them into firm engagement with the sides of the mirror 10, and while this pressure is maintained the nut 17 is tightened.

The strips 35 and 36 are desirably somewhat elastic and so shaped that they are deformed and stressed somewhat in the operation of forcing their bent-over ends into engagement with the sides of the mirror 10. One method of accomplishing this is illustrated somewhat exaggeratedly in Fig. 6, where the mirror 10 is shown as provided with a beveled edge and the strip 35 is formed, as indicated in dotted lines, so that the extreme tip engages the beveled edge of the mirror 10. When pressure laterally of the mirror is exerted on the bent-over ends of the strips 35 and 36, these ends will be deformed slightly to conform to the shape of the mirror, as indicated in full lines of Fig. 6. This deformation stresses the more or less elastic metal of which the strips 35 and 36 are preferably formed, with the result that when the nut 17 is tightened to clamp the two strips together the bent-over ends resiliently press against the sides of the mirror 10 and prevent its longitudinal displacement.

I claim as my invention:

1. In a mounting for a mirror, two clamping members disposed in overlapping relation and extending across the back of said mirror, provisions on said members for engaging the edges of said mirror, a nut secured to one of said members, the other of said members being provided with an opening in line with said nut, a mirror-mounting member having a screw-threaded shank adapted to pass through said opening and into said nut, and a second nut on said shank adapted to clamp said two clamping members together.

2. In combination, a mirror, two clamping members disposed in overlapping relation and extending across the back of said mirror, the ends of said members being bent to embrace the edges of the mirror, said members being of elastic material and being formed to be stressed when their bent ends are forced into engagement with the mirror-edges, and means for clamping the overlapping ends of said members together to hold them in position with their ends resiliently gripping said mirror, said means exerting its clamping force in a direction transversely of the plane of the mirror.

3. In combination, a mirror, two clamping members disposed in overlapping relation and extending across the back of said mirror, the ends of said members being bent to embrace the edges of the mirror, said members being of elastic material and being formed to be stressed when their bent ends are forced into engagement with the mirror-edges, and a mirror-mounting member, said mirror-mounting member being provided with two screw-threadedly associated abutments co-operating respectively with said two clamping members and arranged to force them into frictional engagement.

4. In combination, a mirror, two clamping members disposed in overlapping relation and extending across the back of said mirror, the ends of said members being bent to embrace the edges of the mirror, and a mirror-mounting member, said mirror-mounting member being provided with two screw-threadedly associated abutments co-operating respectively with said two clamping members and arranged to force them into frictional engagement.

5. In combination, a mirror, two clamping members disposed in overlapping relation and extending across the back of said mirror, the ends of said members being bent to embrace the edges of the mirror, said members being of elastic material and being formed to be stressed when their bent ends are forced into engagement with the mirror-edges, and a part, said part being provided with two screw-threadedly associated abutments co-operating respectively with said two clamping members and arranged to force them into frictional engagement.

EARL C. BOOTH.